G. H. FLAD.
LENS BLOCKING APPARATUS.
APPLICATION FILED APR. 9, 1917.
1,284,283.
Patented Nov. 12, 1918.
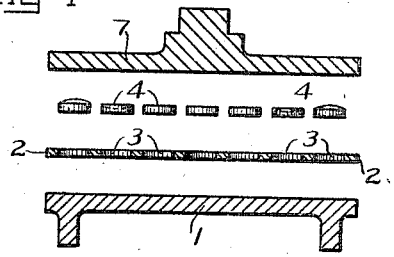
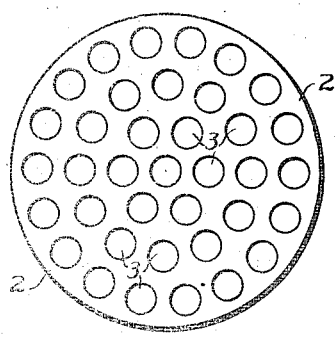
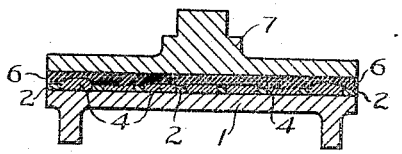
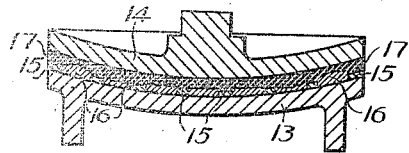
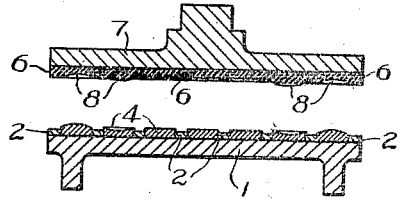
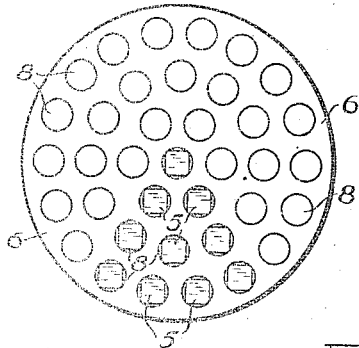
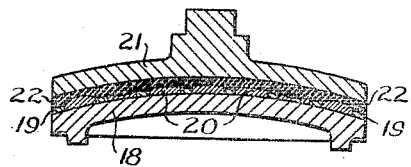
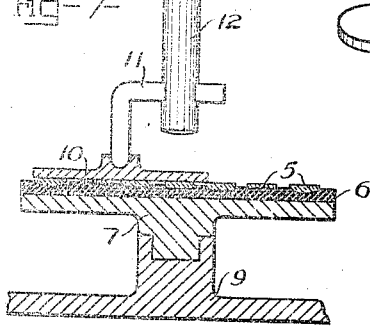
INVENTOR
Gotlieb H. Flad
BY
his ATTORNEYS

UNITED STATES PATENT OFFICE.

GOTLIEB H. FLAD, OF ROCHESTER, NEW YORK, ASSIGNOR TO BAUSCH & LOMB OPTICAL COMPANY, OF ROCHESTER, NEW YORK, A CORPORATION OF NEW YORK.

LENS-BLOCKING APPARATUS.

1,284,283.  Specification of Letters Patent.  Patented Nov. 12, 1918.

Application filed April 9, 1917. Serial No. 160,671.

*To all whom it may concern:*

Be it known that I, GOTLIEB H. FLAD, a citizen of the United States, residing at Rochester, in the county of Monroe, State of New York, have invented certain new and useful Improvements in Lens-Blocking Apparatus; and I do declare the following to be a full, clear, and exact description of the same, reference being had to the accompanying drawings, forming a part of this specification, and to the characters of reference marked thereon.

This invention relates more particularly to apparatus for blocking lens blanks preparatory to grinding and polishing them, and has for its main object to provide a lens blank blocking apparatus which renders unnecessary expensive skilled labor for forming accurate impressions of those faces of the lens blanks secured to the lens block prior to grinding their opposite faces to either plano or curved forms, and also to assure unusual durability of the blocking tools and to provide for their repair or replacement at minimum expense, thereby lessening the cost of the finished lenses while also assuring that curved lenses of any form so blocked shall be free from refractive aberration of astigmatism.

In the drawings:

Figure 1 is a vertical section of the separated elements used in one embodiment of this invention as employed for blocking a group of lens blanks upon each of which a plano face is to be ground. Fig. 2 is a face view of the templet shown in Fig. 1. Fig. 3 is a perspective view of one of the lens spot patterns. Fig. 4 is a cross section showing the first step of molding the plastic material upon the spots and templet to the form of those surfaces of the various lens blanks to later be secured to a pitch layer on the block. Fig. 5 is a cross section illustrating the block and the adhering impressed and hardened plastic material and shown separated from the spots and templet which remain on the underlying surface plate. Fig. 6 is a top plan view of the plano block showing the impressions of the spots made in the plastic material thereon, and with but ten lens blanks on a like number of the spot impressions. Fig. 7 is a sectional elevation showing the plano lens block and the entire group of applied lenses as adjusted for operation of a superimposed plano grinding tool. Fig. 8 is a cross section illustrating the taking of impressions of spots held on a concave surface plate. Fig. 9 is a cross section illustrating the taking of impressions of spots held on a convex surface plate.

First referring more particularly to Figs. 1 to 7 of the drawings, the numeral 1 indicates a plano surface plate corresponding in facial form to the grinding lap and 2 indicates a flat templet which in use is laid upon the plate 1, or upon the grinding lap itself, and has a plurality of openings 3 in which are first placed a series of quite closely fitting patterns or spots 4, shown with one lower plane face and shaped at their upper faces to correspond with the contour of the finished or unfinished plano or convex or concave faces of a series of lens blanks 5 shown in Figs. 6 and 7 of the drawings. The edges or peripheral faces of the spots 4 which fit within the templet openings 3 are preferably somewhat thicker than the templet 2, as more clearly shown in Figs. 1 and 5, to later provide for both a face and an edge hold for the lens blanks in the bed 6, composed of pitch or other adhesive compound adhering to the face of the lens block 7; the lens blanks 5 being applied in the molded impressions formed by the spots 4.

In practising one embodiment of this invention, the templet 2 is first laid upon the surface plate 1, and the lens patterns or spots 4 are placed in the templet openings 3 and rest on the plate. Any suitable powder facing is now dusted over the templet and the spots, and a layer 6 of pitch then is applied over the facing covered templet and spots. The lens block 7, usually made of iron, to which the pitch will tenaciously adhere, is now placed upon the soft pitch layer 6 upon which the block is manually or otherwise pressed with sufficient force to mold the pitch into impressions or forms 8 corresponding to the contour of the upper faces of the spots 4, and the intervening flat and slightly lower portions of the templet 2, as shown in Fig. 4 of the drawings. After the molded pitch layer 6 has set or hardened sufficiently, the lens block 7, with the adhering molded and hardened pitch, is lifted from the templet 2 and spots 4 which remain upon the surface plate 1, as shown in Fig. 5.

The block 7, is now inverted to bring its adhering molded pitch layer 6 uppermost, and the lens blanks 5 which are to be ground, after being sufficiently heated so as to soften the surface of the impressions in the pitch are laid with their proper faces downward into the correspondingly formed impressions 8, and under light manual pressure will adhere firmly to the pitch on their faces and at their edges or corners, thus giving the blanks both a face hold and an edge hold. The pitch which quickly hardens, as the heated blanks cool, securely holds them in true position on the lens block 7 relatively to the optical axes of any or all curved faces of the blanks which may have been first ground or finished on their obverse faces. Ten of the lens blanks 5, so held in the pitch impressions 8, are shown in Fig. 6, but prior to the following grinding operation a blank will usually be secured in each impression 8 of the pitch layer 6, to load the block 7 to its full lens blank capacity. Should the lens blanks 5 have a marginal contour corresponding with the sunken marginal walls of the pitch impressions 8, the blanks will fill such impressions and have a peripheral edge hold therein. If the applied lens blanks have a square form, with rounded corners, as shown in Fig. 6, said corners only may have an edge hold in the pitch impressions 8.

Fig. 7 of the drawings shows the lens blank carrying block 7 held to a supporting part 9 of a lens grinding machine having a plano grinding tool or lap 10 operated by a cranked pin 11 rotating with a shaft 12 to which the pin is fixed, for grinding in true planes the upper faces of all the lens blanks 5 fastened to the block 7. It will be seen that the use of the templet 2 with the spots 4, assures the projection of the unground faces of the lens blanks 5 well above the outer face of the pitch layer 6, or for a distance about equaling the thickness of the templet 2, and consequently there can be no interference by the pitch layer with the following lens grinding operation which may be begun almost immediately after the lens blanks 5 are manually applied to the pitch layer 6, as little or no routing or cutting away of surplus pitch from around the edges of the lens blanks is necessary. In the illustrated examples some of the finished lenses when removed from the pitch layer 6 would have double-plano form, others would have plano-convex form, and still others would have plano-concave form, but the entire group of lenses may have similar form, and the ground lenses of any form may have any desired thickness, and the curved faces of the lenses may be struck on arcs having longer or shorter radii as may be required to produce any special refractive qualities in the lenses.

This invention is especially well adapted for blocking groups of lens blanks which are to be ground convex or concave on their reverse faces after their obverse faces have first been ground either convex or concave, because it provides means including a templet for securing the half finished lenses to the pitch faced block in a manner assuring exact alinement of the optical axes of opposite curved faces of the finished lenses. In view of the aforesaid description, Figs. 8 and 9 of the drawings sufficiently illustrate this feature of the invention.

In Fig. 8, the surface plate 13, corresponding to the grinding lap, is concave and is curved on an arc which corresponds with the desired degree of convexity to be given the reverse faces of the lens blanks secured to the convex block 14 prior to the final grinding and polishing operations. The templet 15 is here convexed to fit closely upon the concave plate 13, and the spots 16, preferably having lower faces fitting closely upon the plate are placed thereon within the openings of the preferably thinner templet 15. The spots and templet now are dusted with a powder facing and then are covered by a soft pitch layer 17 upon which the convex block 14 is pressed to form in the pitch impressions of the upper faces and portions of the edges of the spots, and after the pitch has hardened the block 14, with the adhering impressed or molded pitch layer 17, is lifted from the templet and spots and inverted and the heated lens blanks are pressed with their first finished obverse faces upon the proper spot impressions and adhere thereto. The lens blank holding block 14 is now placed upon a grinding machine element such as 9, and a suitable concave grinding lap is employed to reduce the reverse and now uppermost faces of the blanks to the desired convex form. In Fig. 9 of the drawings the surface plate 18 is convex, and the templet 19 and the lower faces of the preferably thicker spots 20 conform thereto, and the concave lens block 21 presses an interposed pitch layer 22, which later receives and adhesively supports the lens blanks in the spot impressions in readiness for grinding the blanks to concave form at their projecting reverse faces by a suitable convex grinding tool. In both adaptations of the invention shown in Figs. 8 and 9, the routing of surplus pitch from around the lens blanks attached to the lens block is avoided or minimized by using the curved templet, substantially as when the above described plano surface plate and templet and lens block are employed.

The finished faces of the spots 16 or 20, which correspond in form with the first finished obverse faces of the lens blanks are truly formed relatively to the opposite faces of the spots which rest on the surface plates, so that when the spots are laid upon the corresponding surface plate 13 or 18, they will make such truly centered impressions in the pitch layer 17 or 22, when pressed by the lens block 14 or 21, that when the lens blanks already finished on their first or obverse faces are applied to the spot impressions in the pitch layer on the lens block, the optical centers of the first finished obverse blank faces will be in exact alinement with the optical centers of the later finished reverse faces of the lenses which are ground by a tool, or lap, having substantially the same curvature as the surface plate 13 or 18, and consequently the finished lenses having curved opposite faces will be free from refractive aberration or astigmatism.

A marked advantage of this invention lies in the facility with which the lens blocking tools, especially the surface plate, corresponding to the grinding lap, and the templet, are first accurately made and remain in working order. By using this invention the surface plate may be quickly and accurately machined either plane or curved, or the grinding lap itself may be used on a support for the templet and spots. The templet may easily and cheaply be made from rolled sheet metal of standard thickness and later drilled to form the spot receiving openings 3 of proper size, and then curving those templets which are to conform to convex or concave surface plates. Furthermore, should the originally true face of any surface plate become worn at places by long use, the entire face of the plate may again be cheaply machined to produce another uniformly true surface, and one surface plate may be resurfaced several times and thus may be serviceable for a long period.

Having thus described my invention, what I claim and desire to secure by Letters Patent of the United States is:

1. A lens blocking apparatus comprising a surface plate, and a templet adapted to overlie the surface plate and having a plurality of openings adapted to receive and position a plurality of lens spot patterns upon the surface plate preparatory to taking their impressions in adhesive material on a lens block.

2. A lens blocking apparatus comprising a surface plate, a templet adapted to overlie the surface plate and having a plurality of openings, and a plurality of lens spot patterns each having a thickness greater than the thickness of the templet and adapted to seat themselves steadily upon the surface plate within said openings preparatory to taking their impressions in plastic material on a lens block.

3. In a lens blocking apparatus, the combination of a surface plate having a surface curved to correspond to the surface of a grinding lap, a templet curved to correspond to the curvature of the plate and having a plurality of spaced openings, lens spot patterns in said openings and projecting above the surface of the templet, a lens block, and means for taking impressions of the lens spot patterns on the lens block.

4. In a lens blocking apparatus, the combination of a surface plate having a surface curved to correspond to the surface of a grinding lap; a templet supported on said plate and having a plurality of spaced openings of uniform size therein, lens spot patterns projecting from said openings, and a lens block adapted to receive impressions of the lens spot patterns.

GOTLIEB H. FLAD.

Copies of this patent may be obtained for five cents each, by addressing the "Commissioner of Patents, Washington, D. C."